United States Patent Office 2,820,984
Patented Jan. 28, 1958

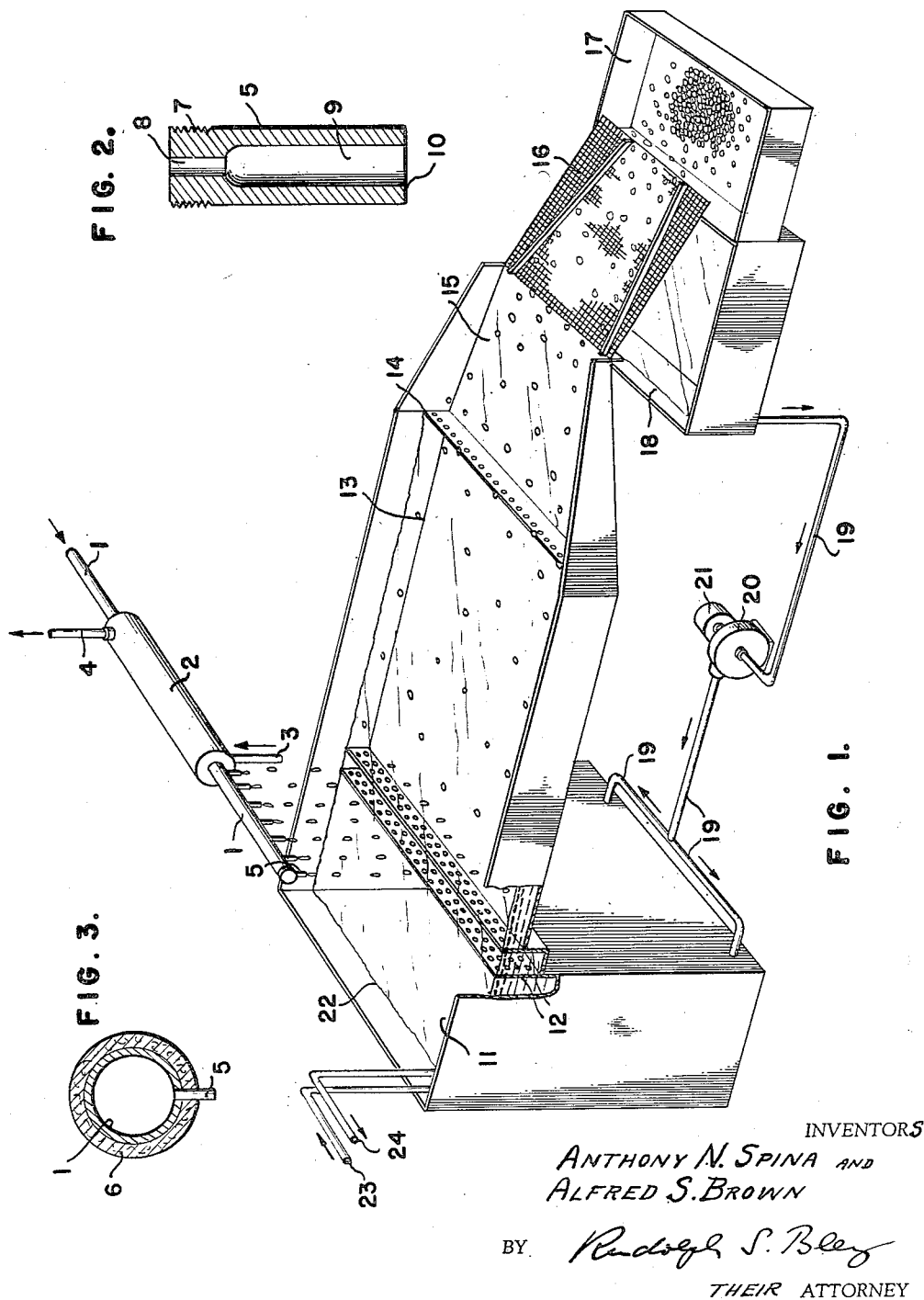

2,820,984

METHOD AND APPARATUS FOR PRODUCING REGENERATED CELLULOSE PELLETS

Anthony N. Spina, Frankfort, and Alfred S. Brown, Hamilton, N. Y., assignors to Skenandoa Rayon Corporation, Utica, N. Y., a corporation of Delaware Application July 27, 1951, Serial No. 238,914

5 Claims. (Cl. 18—2.4)

This invention relates to the production of homogeneous, substantially uniformly sized pellets of regenerated cellulose.

It is an object of the invention to provide a method and apparatus for the production of pellets of regenerated cellulose from viscose and, more particularly, pellets that are uniform in structure and in size.

A further object is to provide a method and apparatus for forming viscose solution into uniformly sized drops or globules and for introducing such uniform drops under controlled conditions into coagulating and regenerating baths.

A still further object is to provide a method for coagulating and regenerating such drops of viscose under conditions adapted to yield substantially uniformly sized pellets of regenerated cellulose, devoid of surface defects.

Regenerated cellulose pellets such as those used as packing or filling materials, for example in electrical devices such as transformers, circuit breakers, lightning arresters and the like, are required to be substantially uniform in structure and in size. Pellets constituted of regenerated cellulose can be produced by treating globules or drops of viscose solution with suitable coagulating and regenerating solutions. However, it has been found difficult if not practically impossible heretofore to effect quantity production of pellets of uniform size and structure and to avoid defects such as cracked or wrinkled surfaces, the occurrence of gas bubbles in the pellets and the presence of so-called "warts," "tails," or similar excrescences thereon. Prior efforts to produce regenerated cellulose pellets are exemplified by Battista Patent No. 2,465,343, Kulp Patent No. 2,541,165, and O'Neill et al. Patent No. 2,543,928. So far as we are aware, however, each of these patents relates to a process that has one or more serious drawbacks as regards the large scale production of regenerated cellulose pellets of uniformly high quality.

The drawbacks of prior art production methods and the defects inherent in pellets produced thereby are obviated by the method of the present invention and the apparatus used in practising the same.

In practising the invention, viscose solution is caused to issue from a nozzle-like device constituting part of the apparatus of the invention and adapted to produce uniformly sized drops or globules, and the drops or globules thus produced are coagulated and regenerated in suitable baths under controlled conditions adapted to prevent distortion of the pellets formed from such drops. More specifically, as the drops or globules are formed, they are first dropped into a coagulating bath wherein they are subjected to a preliminary limited regenerating action during which time a thin skin is caused to form on the drops. This bath is caused to flow without turbulence and eddy currents and serves to move the pellets out of the dropping zone, the regeneration of the pellets and further treatment thereof being then completed in ensuing steps of the method.

The portion of the bath located directly beneath the nozzles and into which the globules fall is herein referred to as the dropping zone. As the skin is in process of being formed on the globules during their conversion into pellets, their removal from the dropping zone and their further passage through the bath is effected solely through agency of the quiescently flowing bath which is caused to flow along without turbulence and eddy currents. This serves to prevent deformation and other mechanical damaging of the skin-encased globules. After being moved to a point in the preliminary bath remote from the dropping zone, the skin-encased pellets are collected and treated to complete the regeneration and to condition them for ultimate use.

The various features of the apparatus and method of the invention will become apparent from the following detailed description when considered in connection with the accompanying drawing.

In the drawing:

Fig. 1 is a perspective view of one arrangement of apparatus suitable for practising the invention and illustrating the production of regenerated cellulose pellets from viscose.

Fig. 2 is a section through one of the nozzle-like devices used for forming the viscose into globules or drops.

Fig. 3 is a section through the viscose supply pipe showing the heat insulation therefor and one of the nozzle-like devices of Fig. 2 attached to said pipe.

By way of illustrative but non-limiting example the invention will be described as applied to the making of substantially uniformly sized homogeneous regenerated cellulose pellets of round, bead-like appearance, having a diameter of substantially 0.09 inch, this being representative of the type of pellets well adapted for use as a filler material in the electrical arts.

In practising the method of the invention the first step is to form the viscose into uniformly sized globules or drops. In the apparatus shown in the drawing this is accomplished by means of a nozzle-like device 5. This forms an important element of the apparatus and its function in controlling the flow of the viscose so as to produce drops of the desired type is an important feature of the method of the invention. The device 5, shown in detail in Fig. 2, is constituted as a tubular body portion provided with a screw thread 7 for mounting the same on the supply pipe 1. The rear or top portion, i. e., the portion nearest the pipe 1, is bored out as at 8 to provide a passage of relatively small diameter and the front or lower portion, that is, the free protion, is bored out as at 9 to provide a passage of a diameter larger than that of passage 8, the two passages being contiguous. In practice, a suitable number of such nozzle-like drop-forming devices are mounted on the pipe 1 as shown in Fig. 1.

The viscose solution is supplied under suitable pressure by the pipe line 1 and is heated to 45–48° C., for example by means of hot water circulating through the jacket 2 surrounding the pipe 1, the inlet and outlet of said jacket being indicated by 3 and 4 respectively. The pipe 1 is preferably lagged with insulating material 6 (Fig. 3) to prevent cooling of the viscose.

The thick viscous liquid present in the operating region that includes the supply pipe 1 and the small diameter passage 8 of the nozzle-like device 5 contiguous therewith is under pressure and moves as a homogeneous relatively slowly flowing body. The larger passage 9, however, constitutes a region in which the flow of the liquid is slowed down. The liquid then gradually gathers as a mass at the edge of the orifice 10 that defines the limit of this second region. As shown in Fig. 2, the top of passage 9 is rounded off or arched at the point where it adjoins passage 8 to facilitate the guiding of the liquid therethrough.

The collected mass then detaches itself from the edge of the orifice 10 in the form of globules or drops which fall into the coagulating bath trough 13. It is essential that the rate of flow of the viscose solution and its composition and characteristics be held within suitable limits as hereinafter defined. The size of the pellets produced from globules of viscose dropped from such an orifice depends on the cellulose content of the viscose, the viscosity of the latter, the thickness of the orifice wall 10, the diameter of the larger viscose passage 9, and the operating pressure with which the viscose is forced through pipe 1 and passage 8. It has been found, for example, that with a given orifice, increasing the cellulose content of the viscose solution from 7.5% to 8.0% increases the size of the finished pellets from 0.08 to 0.09 inch. With a given viscose and an orifice in which the diameters of the viscose solution passages 8 and 9 are fixed, it was found that orifice tip walls 0.211 inch thick gave large drops while orifice tip walls 0.03 and 0.01 inch thick gave smaller drops. Thicker walls are not satisfactory because small secondary drops tend to form thereon, resulting in non-uniformity in pellet size. Thinner walls produced only a few secondary drops. It was found that orifice tip walls 0.07 inch thick gave pellets of acceptable uniformity. It is apparent that with given viscose characteristics and nozzle dimensions the drop size, and therefore the pellet size, will depend on the diameter of the viscose passage 9 to a large extent.

In an actual embodiment of the drop-forming device that has been found suitable for use with the viscose solution and coagulating and regenerating baths hereinafter described for producing pellets having a diameter of 0.09 inch, the nozzle-like member 5 was 1 inch in length, the passage 8 was 0.09 inch in diameter and its length 5/16 inch, whereas the passage 9 was 11/64 inch in diameter and 11/16 inch long. The outlet orifice wall 10 was 0.07 inch thick. This nozzle-like device controls the flow of the viscose in such fashion as to produce substantially uniformly sized drops at the orifice 10.

Although regenerated cellulose pellets may be produced from conventional viscose solutions, such as those used in the production of rayon yarn and containing about 7% cellulose and alkali equivalent to about 6½% NaOH, it has been found preferable to use a modified viscose in order to insure production of pellets that are smooth, uniform in structure and substantially uniform in size and shape. Such modified viscose is devoid of the surface-active materials frequently added to viscose, and has a lower viscosity and higher cellulose content than the viscose customarily used for making yarn. A viscose suitable for use in preparing pellets in accordance with the invention is one having the following composition:

| | | |
|---|---|---|
| Cellulose | percent | 8.0 |
| Alkali (NaOH) | do | 6.4 |
| Surface tension (23° C.) | dynes/cm | 53–57 |
| Ball fall viscosity | seconds | 31–35 |
| Hottenroth maturity | | 5.5–7.0 |

The bath 13 into which the globules fall is a preliminary aqueous acid-salt bath capable of coagulating the viscose and having sufficient regenerating action to produce a thin skin of regenerated cellulose on the globules. The drop distance from the member 5 to the surface of the bath 13 is preferably 56–60 inches. Such a bath is preferably constituted of 2–5% $H_2SO_4$, 15.5–16% $Na_2SO_4$, and 15.5–16.0% $(NH_4)_2SO_4$, and is maintained at a temperature of 35–40° C. The nature of this preliminary bath is quite critical because, if the acid content is appreciably higher than 5%, say 7% $H_2SO_4$, skin formation will be very rapid and the pellets will wrinkle on drying. If the salt content is only 28% (14% $Na_2SO_4$ and 14% $(NH_4)_2SO_4$) the pellets will exhibit "tails" and "warts," whereas a salt content of 34% (17% $Na_2SO_4$ and 17% $(NH_4)_2SO_4$) yields flattened and wrinkled pellets. If 31–32% $Na_2SO_4$ is used in lieu of the $Na_2SO_4$-$(NH_4)_2SO_4$ salt mixture, the pellets will contain gas bubbles; if 31–32° $(NH_4)_2SO_4$ is used in place of the $Na_2SO_4$-$(NH_4)_2SO_4$ salt mixture, no skin formation will take place.

In this first bath the globules float and remain for about 15 to 60 seconds and become preliminarily coagulated and acquire a skin which protects them from deformation and damage during their further passage through the apparatus.

In the embodiment of the apparatus shown in Fig. 1, the coagulating or preliminary bath flows from the tank 11 through a plurality of openings in baffles 12, through trough 13 and over a lower baffle 14 which is provided with a plurality of openings as shown. The trough 13 is sloped slightly so that the coagulating bath flow will allow each viscose globule to remain therein for approximately 15 to 60 seconds. The baffle structures prevent bath turbulence and the formation of eddy currents which might distort the viscose globules or cause them to remain in the dropping zone while other globules are dropping and thus suffer mechanical damage. The bath flow causes the pellets, as they are being formed from the globules, to rotate slowly as they move through the trough 13, thus exposing the entire pellet to the action of the bath. After passing over the lower baffle 14 the pellets roll down the incline 15, over the inclined screen 16 and into the wire screen tray 17. The preliminary coagulating bath which flows over the lower baffle 14 and the portion thereof which drops through the screen 16 is collected in tank 18 and returned to the tank 11 through pipe lines 19 by means of pump 20 driven by motor 21. The operation of pump 20 is adjusted to provide a constant bath level 22 in tank 11 so that the rate of bath flow through the trough 13 will always be the same. The temperature of the coagulating bath may be maintained by means of a steam coil (not shown) in tank 11, the inlet and outlet of which are indicated by 23 and 24 respectively. Acid and other ingredients may be added to the coagulating bath at any point to maintain the bath composition as specified above.

Complete regeneration of the partially coagulated pellets collected on the wire screen 17 is effected by treating them for approximately 5 hours at 70–80° C. in a separate or second regenerating bath (not shown) containing for example 7–11% $Na_2SO_4$ and which is maintained at a pH of 6 to 7 by adding 10% $H_2SO_4$ as needed. The addition of 50 g. $NaH_2PO_4$ and 25 g. $Na_2HPO_4$ per 4000 grams of regenerating bath gives an initial pH of 6.0 to 6.1 and facilitates later control by buffer action. The nature of this bath is also of importance. If the bath contains less than 7% $Na_2SO_4$ the pellets will tend to lack homogeneity, while if the bath contains more than 11% $Na_2SO_4$, the pellets will tend to float, making uniform regeneration difficult. The regeneration may be effected by treating batches of the preliminarily coagulated pellets as a separate step.

The completely regenerated cellulose pellets are washed with water at approximately 30° C. until the water-soluble electrolytes and other impurities are removed and are then spread in a single layer and dried by means of a current of air at approximately 30° C. or by means of a high frequency electrical field. The moisture content of the dried pellets is preferably about 6 to 8%.

Modifications of the process and apparatus will be apparent to those skilled in the art, and it is intended to include all modifications coming within the purview of the appended claims.

What is claimed is:

1. The method of making uniformly sized pellets of regenerated cellulose comprising the steps of continuously heating to a temperature of 45–48° C. a viscose comprising substantially 8% cellulose, 6.4% alkali (in the form of NaOH), having a surface tension at 23° C. of 53 to 57 dynes per centimeter, a ball fall viscosity of 31 to 35 seconds and a Hottenroth maturity of 5.5 to 7., continuously forming said heated viscose into uniformly sized globules, causing said globules to drop through a height of 56 to 60 inches into a dropping zone of a quiescently flowing preliminary bath adapted to effect coagulation and sufficient regeneration to form a protective skin on said globules and consisting substantially of 2 to 5% $H_2SO_4$, 15.5 to 16% $Na_2SO_4$, and 15.5 to 16.0% $(NH_4)_2SO_4$ maintained at a temperature of 35 to 40° C., moving the skin-encased globules through said bath and away from said dropping zone solely by the action of said bath, collecting the preliminarily regenerated pellets and completing the regeneration and after-treatment thereof.

2. The method of making uniformly sized pellets of regenerated cellulose comprising the steps of continuously heating to a temperature of 45–48° C. a viscose comprising substantially 8% cellulose, 6.4% alkali (in the form of NaOH, having a surface tension at 23° C. of 53 to 57 dynes per centimeter, a ball fall viscosity of 31–35 seconds and a Hottenroth maturity of 5.5 to 7, continuously forcing said heated viscose through a first flow confining region under pressure and into a second flow confining region contiguous with but substantially larger than the first, causing the viscose to flow through said second region by gravity and to collect in the form of globules at a point in said second region and to drop off therefrom, catching the dropped-off globules in a dropping zone of a quiescently flowing preliminary bath adapted to effect coagulation and sufficient regeneration to form a protective skin on said globules and consisting substantially of 2 to 5% $H_2SO_4$, 15.5 to 16% $Na_2SO_4$ and 15.5 to 16.0% $(NH_4)_2SO_4$, maintained at a temperature of 35–40° C., moving the skin-encased globules through said bath and away from said dropping zone solely by the action of said bath, collecting the preliminarily regenerated pellets and completing the regeneration and after-treatment thereof.

3. In an apparatus for forming pellets of regenerated cellulose wherein globules of viscose are dropped into a coagulating bath, the improvement comprising a supply pipe for conveying viscose under pressure, a plurality of globule-forming nozzles attached to and depending from said pipe, a hot water jacket surrounding a portion of said pipe for continuously heating the viscose passing through said pipe immediately before the viscose enters said nozzles, each of said nozzles having a constricted liquid flow region directly communicating with said supply pipe, a less constricted liquid flow region contiguous with said first region, an aperture at the end of said second region defined by a drop-forming surface for gathering in detachable globule form the viscose received in said second region, a gently sloping trough having a coagulating bath for receiving the viscose globules dropped from said nozzles and for coverting said globules into skin-encased pellets, said nozzles being disposed above a dropping zone of said bath, and perforated baffles positioned at the upper end of said trough for admitting the coagulating bath into said trough and for effecting a quiescent non-turbulent flow of said bath devoid of eddy currents in said trough, said flow of said bath being adapted to move said skin-encased pellets away from said dropping zone and through said bath.

4. An apparatus for forming pellets of regenerated cellulose comprising a supply pipe for conveying viscose solution under pressure, a plurality of nozzles attached to said pipe, means surrounding said supply pipe for heating the viscose solution to decrease the viscosity of the viscose solution just prior to the extrusion of the pellets of viscose from said nozzles, said nozzles having passages therethrough shaped so that subtantially uniform pellets of viscose drop off of said said nozzles, a trough having the front end thereof positioned beneath said nozzles for receiving the viscose pellets dropping from said nozzles, a tank connected to the front end of said trough for feeding a viscose coagulating liquid from the top portion of said tank to said trough, said trough slightly sloping from the front end thereof to the rear, perforated baffle means for dividing said tank from said trough for controlling the flow of the viscose coagulating liquid from said tank into said trough so that said liquid flows in a quiescent manner through said trough from the front to the rear thereof carrying said pellets in a gentle manner to prevent mechanical damage thereto, a perforated baffle positioned in the rear portion of said trough for controlling the flow of said liquid through said trough, said baffle being of such height that some of said liquid flows across across said baffle and carries said pellets with it out of the rear of said trough, means for receiving the pellets carried out of said trough, an auxiliary tank positioned below the rear of said trough for receiving said liquid flowing from the rear of said tank and means for feeding the liquid from said auxiliary tank into the bottom of said first mentioned tank to cause the liquid to flow from said first mentioned tank into said trough through said perforated baffle means.

5. An apparatus for forming pellets of regenerated cellulose comprising a supply pipe for conveying viscose solution under pressure, a plurality of nozzles attached to said pipe, means surrounding said supply pipe for heating the viscose solution to decrease the viscosity of the viscose solution just prior to the extrusion of the pellets of viscose from said nozzles, said nozzles having passages therethrough shaped so that substantially uniform pellets of viscose drop off of said nozzles, a trough having the front end thereof positioned beneath said nozzles for receiving the viscose pellets dropping from said nozzles, a tank having a depth equal to several times the depth of the liquid in said trough, said tank being connected to the front end of said trough for feeding a viscose coagulating liquid from the top portion of said tank to said trough, said trough slightly sloping from the front end thereof to the rear, perforated baffle means for dividing said tank from said trough for controlling the flow of the viscose coagulating liquid from said tank into said trough so that said liquid flows in a quiescent manner through said trough from the front to the rear thereof carrying said pellets in a gentle manner to prevent mechanical damage thereto, a perforated baffle positioned in the rear portion of said trough for controlling the flow of said liquid through said trough, means at the rear end of said trough for receiving the pellets treated in said trough, an auxiliary tank positioned below the rear of said trough for receiving said liquid flowing from the rear of said tank and means for feeding the liquid from said auxiliary tank into the bottom of said first mentioned tank to cause the liquid to flow from said first mentioned tank into said trough through said perforated baffle means.

References Cited in the file of this patent

UNITED STATES PATENTS

| | | |
|---|---|---|
| 1,614,636 | Wachtel | Jan. 18, 1927 |
| 2,210,116 | Dreyfus | Aug. 6, 1940 |
| 2,465,343 | Battista | Mar. 29, 1949 |
| 2,541,165 | Kulp | Feb. 13, 1951 |
| 2,572,998 | Eisner | Oct. 30, 1951 |
| 2,601,642 | Stammer et al. | June 24, 1952 |